United States Patent
Lee et al.

(10) Patent No.: US 8,349,290 B2
(45) Date of Patent: Jan. 8, 2013

(54) MULTI-FLUIDIZED BED WATER-GAS SHIFT REACTOR USING SYNGAS AND PRODUCTION OF HYDROGEN USING THE SAME

(75) Inventors: See Hoon Lee, Daejeon (KR); Jae Ho Kim, Daejeon (KR); Jung Min Shon, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 472 days.

(21) Appl. No.: 12/615,939

(22) Filed: Nov. 10, 2009

(65) Prior Publication Data
US 2011/0033373 A1  Feb. 10, 2011

(30) Foreign Application Priority Data
Aug. 7, 2009  (KR) .................. 10-2009-0072726

(51) Int. Cl.
*B01J 8/28* (2006.01)
*C01B 3/12* (2006.01)
*C01B 3/16* (2006.01)

(52) U.S. Cl. .................. 423/655; 422/142; 423/656
(58) Field of Classification Search .................. 423/655, 423/656; 422/139–147
See application file for complete search history.

(56) References Cited

U.S. PATENT DOCUMENTS

| | | | | |
|---|---|---|---|---|
| 2,702,267 A | * | 2/1955 | Keith | 208/127 |
| 2,960,388 A | * | 11/1960 | Johnson et al. | 423/656 |
| 3,998,929 A | * | 12/1976 | Leyshon | 423/157.2 |
| 4,115,070 A | * | 9/1978 | Jukkola et al. | 422/142 |
| 4,263,262 A | * | 4/1981 | Jukkola | 423/157.2 |
| 4,388,218 A | * | 6/1983 | Rowe | 502/43 |
| 5,379,705 A | * | 1/1995 | Takada et al. | 110/245 |
| 7,771,668 B2 | * | 8/2010 | Ohashi et al. | 422/142 |
| 2007/0124997 A1 | * | 6/2007 | Liu et al. | 48/198.7 |
| 2008/0145309 A1 | * | 6/2008 | Bavarian et al. | 423/651 |
| 2011/0027170 A1 | * | 2/2011 | Lee et al. | 423/655 |

FOREIGN PATENT DOCUMENTS

| | | |
|---|---|---|
| KR | 10-0462286 | 12/2004 |
| KR | 10-0834298 | 5/2008 |

* cited by examiner

*Primary Examiner* — Wayne Langel
(74) *Attorney, Agent, or Firm* — Kile Park Goekjian Reed & McManus PLLC (57) ABSTRACT

A multi-fluidized bed water-gas shift reactor wherein a specific syngas containing a high concentration of carbon monoxide produced by gasification of a heavy carbon source such as coal, vacuum residue, glycerin, etc., is in contact with water under a catalyst so as to produce hydrogen and, in addition, a method for production of hydrogen using the foregoing reactor are disclosed. In other words, the disclosure describes a multi-fluidized bed water-gas shift reactor containing low and high temperature catalysts as well as steam and a method for production of hydrogen using the same, wherein 30 to 70% carbon monoxide in the syngas as a gas mixture containing hydrogen, carbon monoxide, carbon dioxide, hydrogen sulfide, hydrogen monoxide, and the like, which are generated through partial oxidation and vapor gasification at 900 to 1,600° C., may be favorably converted into hydrogen without mixing both of the catalysts.

9 Claims, 10 Drawing Sheets

MULTI-FLUIDIZED BED WATER-GAS SHIFT REACTOR USING SYNGAS AND PRODUCTION OF HYDROGEN USING THE SAME

BACKGROUND OF THE INVENTION

1. Field of the Invention

The present invention relates to a multi-fluidized bed water-gas shift reactor using a synthesis gas ("syngas") and a method for production of hydrogen using the same and, more particularly, to a multi-fluidized bed water-gas shift reactor wherein a specific syngas containing a high concentration of carbon monoxide produced by gasification of a heavy carbon source such as coal, vacuum residue, glycerin, etc., is in contact with water under a catalyst so as to produce hydrogen and, in addition, a method for production of hydrogen using the foregoing reactor. Briefly, the present invention discloses a multi-fluidized bed water-gas shift reactor containing low and high temperature catalysts as well as water vapor (or steam) and a method for production of hydrogen using the same, wherein 30 to 70% carbon monoxide in a syngas as a gas mixture containing hydrogen, carbon monoxide, carbon dioxide, hydrogen sulfide, hydrogen monoxide, and the like, which are generated through partial oxidation and vapor gasification at 900 to 1,600° C., may be favorably converted into hydrogen without mixing both of the catalysts.

2. Description of the Related Art

Since energy conversion through combustion of fossil fuels such as coal, petroleum oil, natural gas, etc., causes serious environmental problems including global warming, practical applications of clean energy conversion technologies other than fossil fuel combustion are increasingly being conducted.

Especially, as a technique for production of hydrogen recognized as a high value future energy resource at economically feasible costs while removing carbon dioxide causing global warming has beneficial features, a number of gasification processes using a fractional bed, a fluidized bed, a fixed bed and the like have been developed in order to achieve the foregoing hydrogen production.

The gasification process using various hydrocarbon materials generates hydrogen as a representative clean fuel; however, an amount of the produced hydrogen is only within 10 to 40% depending on fuel sources, gasification agents, reactor types, operational conditions, etc. Accordingly, a syngas generated during general gasification usually contains a larger amount of carbon monoxide than hydrogen.

Therefore, for practical applications of advanced technologies such as a fuel cell vehicle, a hydrogen engine, a high efficiency hydrogen-combined power generation, and so forth, it is necessary to convert a large amount of carbon monoxide contained in the syngas into hydrogen. Moreover, economical separation of carbon dioxide as an advantage of the gasification process also requires conversion of carbon monoxide in the syngas into hydrogen, thereby ultimately producing a high concentration hydrogen containing flow consisting of hydrogen and carbon dioxide only.

In order to convert carbon monoxide into hydrogen, a conventional fixed bed water-gas shift reactor used for a natural gas reforming process is usually employed. However, such fixed bed water-gas shift reactor has difficulty in operation under conditions of a syngas for gasification that contains 30 to 70% carbon monoxide relative to a total amount of the syngas.

The reason for this is that, as disclosed in published patents, e.g., in Korean Patent No. 0462286 which describes a water-gas conversion catalyst comprising ceramics supported on a metal and a preparation method thereof, recent developments related to water-gas shift reaction have mostly focused on a catalyst rather than improvement of a water-gas shift reactor.

Alternatively, an incineration method using thermal energy to generate the water-gas was disclosed in Korean Patent No. 0834298. This is adapted as a pre-process for combustion instead of generating hydrogen, thus having low hydrogen conversion.

For a waste gasification described in recent patent applications, 30 to 50% carbon monoxide generated during gasification is subjected to treatment and, at the same time, an existing fixed bed/fluidized bed mode is practically embodied. In this regard, a double-layered configuration of the bed may be adopted. However, catalyst loss caused by a bubble fluidized bed process is not continuously supplemented and temperature control is executed only by vapor injection. Therefore, efficiency of carbon monoxide treatment may be relatively low.

Under the foregoing circumstances, in order to increase production of hydrogen used as an energy source, there is still a requirement for development of a process and an apparatus capable of converting 30 to 70% carbon monoxide in a gas mixture into hydrogen, which in turn may favorably enhance hydrogen production.

SUMMARY OF THE INVENTION

Accordingly, the present invention is directed to solving the conventional problems described above and, an object of the present invention is to provide a multi-fluidized bed water-gas shift reactor using a syngas and, in addition, a process for production of hydrogen using the foregoing reactor.

The hydrogen production method includes conversion of carbon monoxide in an amount of 30 to 70% relative a total amount of the syngas generated during gasification using, e.g., a fractional bed, a fluidized bed or a fixed bed in which a hydrocarbon such as coal, petroleum cokes, heavy vapor residue, glycerin, etc. is contained.

In particular, the present invention provides a multi-fluidized bed water-gas shift reactor having a reaction chamber separated into upper and lower parts in which a low temperature catalyst and a high temperature catalyst, respectively, are used to convert a syngas into hydrogen, wherein hydrogen conversion is executed using a catalyst at a high temperature in the lower chamber while hydrogen conversion is also executed using another catalyst at a low temperature in the higher chamber, as well as a hydrogen production method using the foregoing reactor.

Therefore, the present invention has been made in view of the above problems, and it is an object of the present invention to provide a multi-fluidized bed water-gas shift reactor, including a gas reaction tank which has upper and lower chambers separated by a compartment placed in the middle of the tank and in which a syngas containing a high concentration of carbon monoxide reacts with a catalyst to convert the syngas into hydrogen, and the foregoing reactor including:

a high temperature catalytic reaction chamber as the lower chamber partitioned in the tank by the compartment, including a top reaction space in which a high temperature catalyst for converting carbon monoxide into hydrogen at a high temperature is loaded and a bottom mixing space receiving a gas mixture as well as steam, wherein both the spaces are partitioned by a porous plate, and a syngas input line and a steam input line are connected with the bottom mixing space in order to flow the steam as well as the syngas heated by a recuperator (that is, a preheater) into the bottom space, in turn dispersing the syngas and the steam into the top reaction chamber;

a low temperature catalytic reaction chamber as the top reaction chamber partitioned in the tank by the compartment wherein a low temperature catalyst is loaded in the top chamber, and the gas reformed after reaction is discharged through a low temperature reaction gas output line connected to a top of the chamber; and a cyclone that receives the reformed gas after the high temperature reaction from a high temperature reaction gas output line connected to the top of the high temperature catalytic reaction chamber and conducts solid-gas separation to separate a gaseous ingredient, e.g., a high temperature reaction gas, wherein the reaction gas is fed into a lower side of the low temperature catalytic reaction chamber through a high temperature reaction gas input line while the catalyst as the separated solid ingredient returns to the high temperature catalytic reaction chamber through a catalyst recycling line or, otherwise, is exhausted.

Another object of the present invention is to provide a method for production of hydrogen using a syngas by a multi-fluidized bed water-gas shift reactor that has a high temperature catalytic reaction chamber having a bottom mixing space and a top reaction space partitioned therein, a low temperature catalytic reaction chamber integrated to a top of the high temperature catalytic reaction chamber, a cyclone for transporting a reaction gas from the high temperature catalytic reaction chamber to the low temperature catalytic reaction chamber, and first and second heat exchangers mounted on inner top sides of both the chambers, respectively, in order to recover heat, the method including:

a gas introduction process of feeding a gas mixture and a steam into the bottom mixing space of the high temperature catalytic reaction chamber in which a high temperature catalyst is loaded;

a high temperature reaction process of dispersing the gas mixture and the steam throughout the top reaction space of the high temperature catalytic reaction chamber through a porous plate which in turn enables hydrogen conversion by the high temperature catalyst at a high temperature of 300 to 450° C.;

a high temperature reaction gas transport process of separating the high temperature reaction gas from impurities by the cyclone and feeding only a pure high temperature reaction gas into the low temperature catalytic reaction chamber;

a low temperature reaction process of converting the transported gas into hydrogen in the cyclone using a low temperature catalyst at a low temperature of 200 to 250° C.; and a process of discharging the low temperature reaction gas with increased hydrogen content.

As described above, the multi-fluidized bed water-gas shift reactor and the hydrogen production method using the same according to the present invention may produce hydrogen by reaction of a syngas with water in the presence of desired catalyst, wherein the syngas contains a high concentration of carbon monoxide generated when a heavy carbon source such as coal, heavy vapor residue, glycerin, etc. is gasified.

In other words, according to the present invention, 30 to 70% carbon monoxide in the syngas as a mixture of hydrogen, carbon monoxide, carbon dioxide, hydrogen sulfide, hydrogen monoxide, and the like, which are generated by partial oxidation and vapor gasification at 900 to 1,600° C., may be converted into hydrogen using a multi-fluidized bed water-gas shift reactor that contains steam as well as a high temperature catalyst and a low temperature catalyst therein.

Particularly, the multi-fluidized bed water-gas shift reactor has a high temperature catalytic reaction chamber and a low temperature catalytic reaction chamber integrated together wherein hydrogen conversion is sequentially implemented at different temperatures, thus considerably reducing an area for installation of the reactor while maintaining a constant hydrogen conversion rate.

BRIEF DESCRIPTION OF THE DRAWINGS

The above and other objects, features and other advantages of the present invention will be more clearly understood from the following detailed description, taken in conjunction with the accompanying drawings, in which.

DETAILED DESCRIPTION OF THE PREFERRED EMBODIMENTS

Hereinafter, a multi-fluidized bed water-gas shift reactor using a syngas and a hydrogen production method using the same according to the present invention will be described in greater detail in the following exemplary embodiments with reference to the accompanying drawings.

Figure 1:
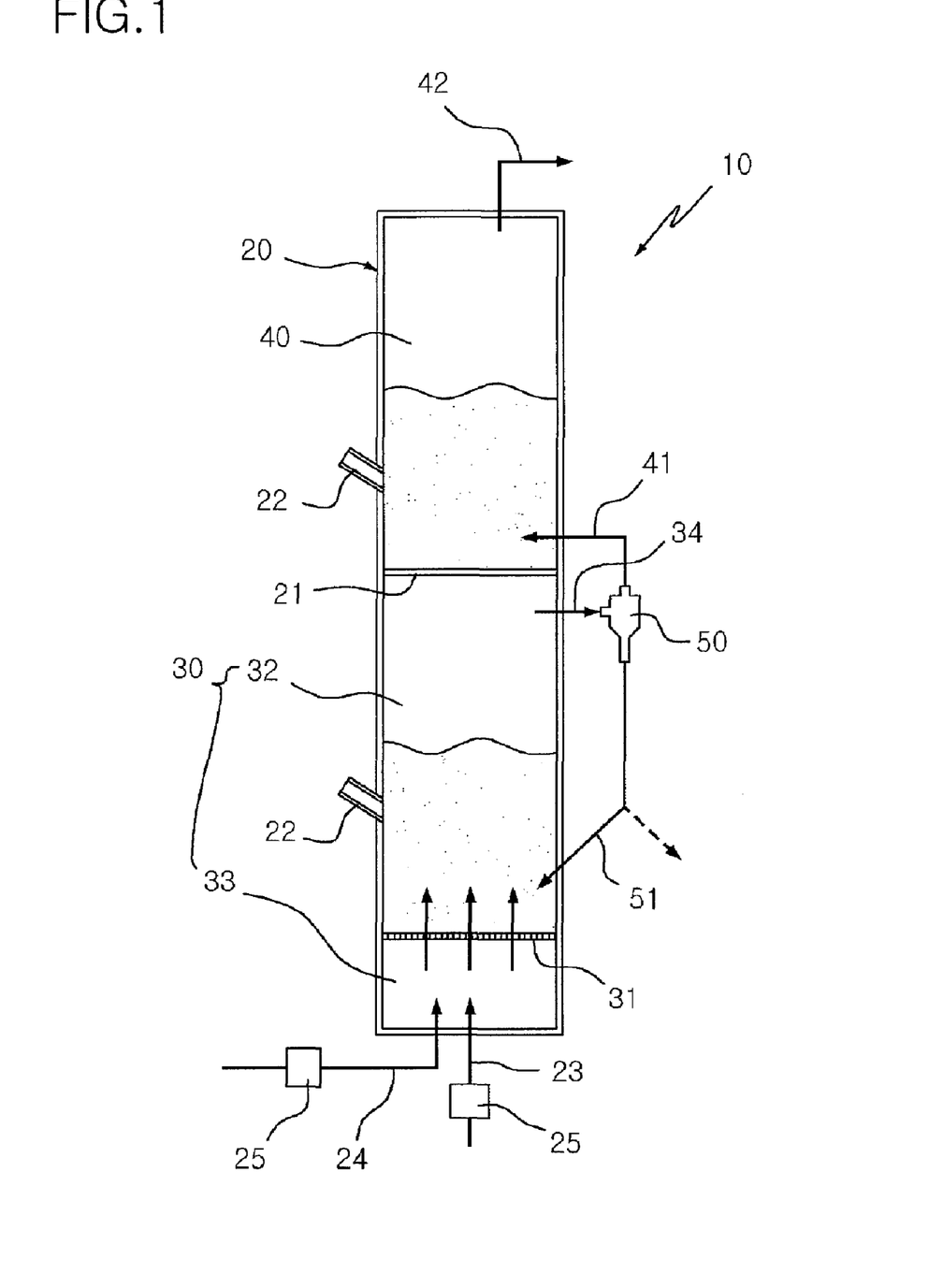
FIGS. 1 to 4 are schematic configuration views illustrating a multi-fluidized bed water-gas shift reactor using a syngas according to an exemplary embodiment of the present invention.

According to an aspect of the present invention, there is provided a multi-fluidized bed water-gas shift reactor 10 comprising: a gas reaction tank 20 having upper and lower chambers separated by a compartment 21 placed in the middle of the tank wherein the lower chamber is a high temperature catalytic reaction chamber 30 and the upper chamber is a low temperature catalytic reaction chamber 40; and a cyclone 50 for transporting a reaction gas from the high temperature catalytic reaction chamber to the low temperature catalytic reaction chamber, as illustrated in FIG. 1.

The high temperature catalytic reaction chamber 30 is placed at a bottom of the gas reaction tank 20 and has an inner area partitioned into a top reaction space 32 and a bottom mixing space 33 by a porous plate 31 made of a metal material.

The top reaction space 32 includes a high temperature catalyst loaded therein, through which an input gas mixture flows, and has a catalyst inlet 22 formed at a lateral side for supplying the catalyst to supplement loss of the catalyst due to abrasion.

The bottom mixing space 33 is connected with a syngas input line 23 and a steam input line 24 to receive the syngas and the steam through the lines. The syngas is generated during gasification and/or melting and gasification and contains carbon monoxide with a high concentration of about 30 to 70%. The syngas input line 23 and the steam input line 24 are separately installed as illustrated in the drawing. Both the syngas and the steam are fed through the foregoing lines, respectively, are blended together in the bottom mixing space 33 and dispersed into the top reaction space 32 through the porous plate 31 or, otherwise, are fed as a mixture thereof into the top reaction space through a single line.

Each of the syngas and the steam is preheated to a desired temperature by a preheater 25 before entering the bottom mixing space 33, so as to maintain a temperature of the top reaction space and, especially, a fluidized bed region containing the high temperature catalyst, in the range of 300 to 450° C.

Next, the low temperature catalytic reaction chamber 40 receives a high temperature reaction gas output from the high temperature catalytic reaction chamber 30 and enables reforming of carbon monoxide to convert the same into hydrogen using the loaded low temperature catalyst. As illustrated in FIG. 1, the low temperature catalytic reaction chamber may directly receive the high temperature reaction gas at a lateral side thereof, in which the low temperature catalyst is loaded, in order to conduct the reaction, or otherwise, may be partitioned into at least two more spaces by the porous plate, like the hot temperature catalytic reaction chamber descried above.

The cyclone 50 transporting the high temperature reaction gas from the high temperature catalytic reaction chamber 30 to the low temperature catalytic reaction chamber 40 is connected to a top of the high temperature catalytic reaction chamber through the high temperature reaction gas output line 34. The high temperature reaction gas input to the high temperature reaction output line is subjected to solid-gas separation to produce a pure gas ingredient and a solid ingredient. The pure gas ingredient, that is, the high temperature reaction gas, is introduced into a bottom of the low temperature catalytic reaction chamber 40 through the high temperature reaction gas input line 41 while the solid ingredient, that is, the catalyst returns to the high temperature catalytic reaction chamber 30 through a catalyst recycling line 51. The low temperature catalytic reaction chamber 40 is also fitted with an output line 42.

However, since the high temperature catalyst contained in the high temperature catalytic reaction chamber 30 is worn or damaged by repetitive reactions of the fluidized bed and in turn is fractured or pulverized into powder. Therefore, the high temperature catalytic reaction chamber 30 contains only the high temperature catalyst in a good state for reaction by removing such catalyst powder without recirculation thereto, thereby improving efficiency of a reforming reaction.

Figure 2:
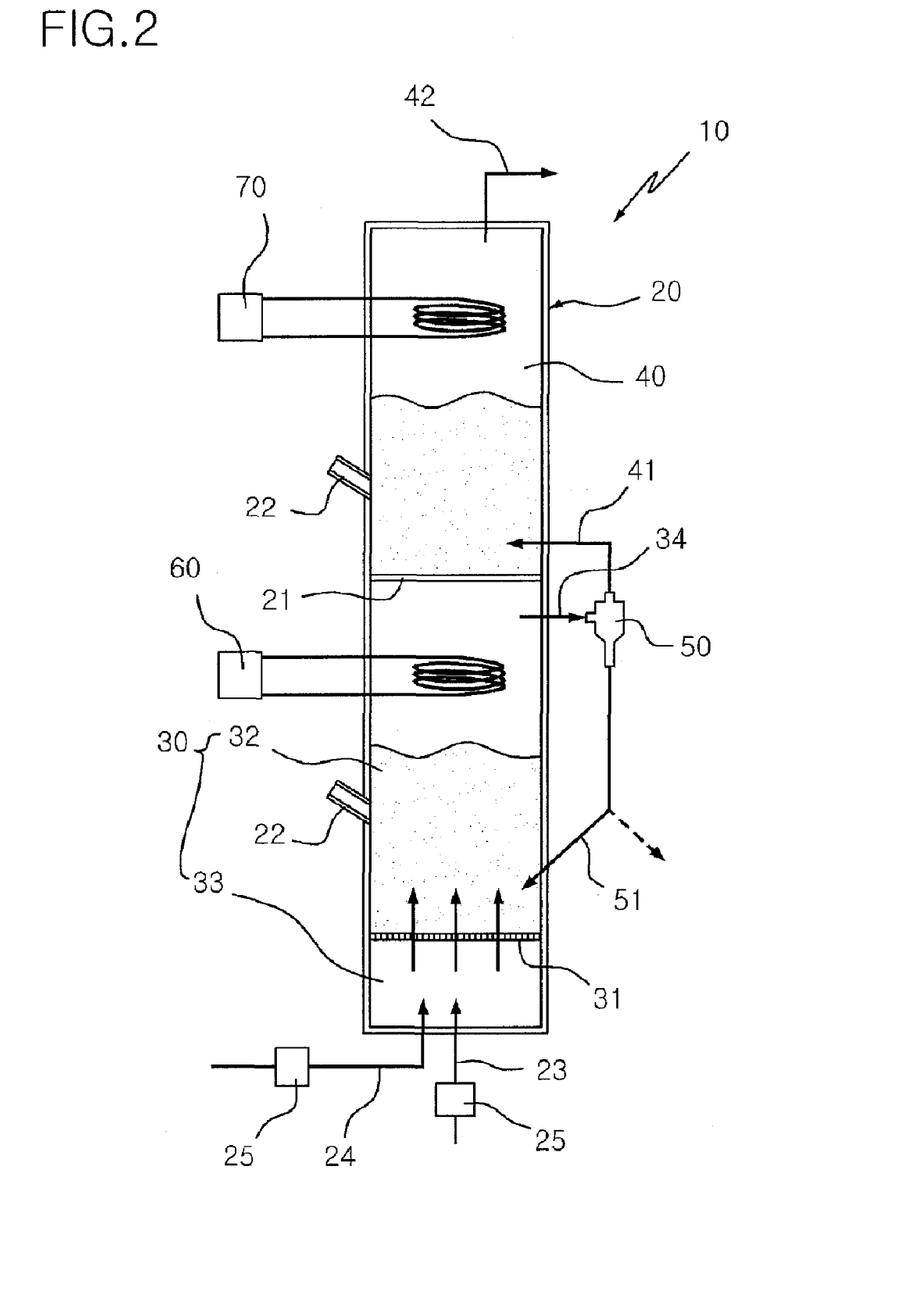

Moreover, the gas reaction tank 20 may have heat exchangers 60 and 70 to decrease a temperature of the reaction gas.

As illustrated in FIG. 2, a first heat exchanger 60 is positioned between a top of the high temperature catalyst fluidized bed and the high temperature reaction gas output line in the top reaction space 32 of the high temperature catalytic reaction chamber, so as to recover heat from the high temperature reaction gas and introduce the reaction gas with decreased temperature into the low temperature catalytic reaction chamber 40.

Figure 3:
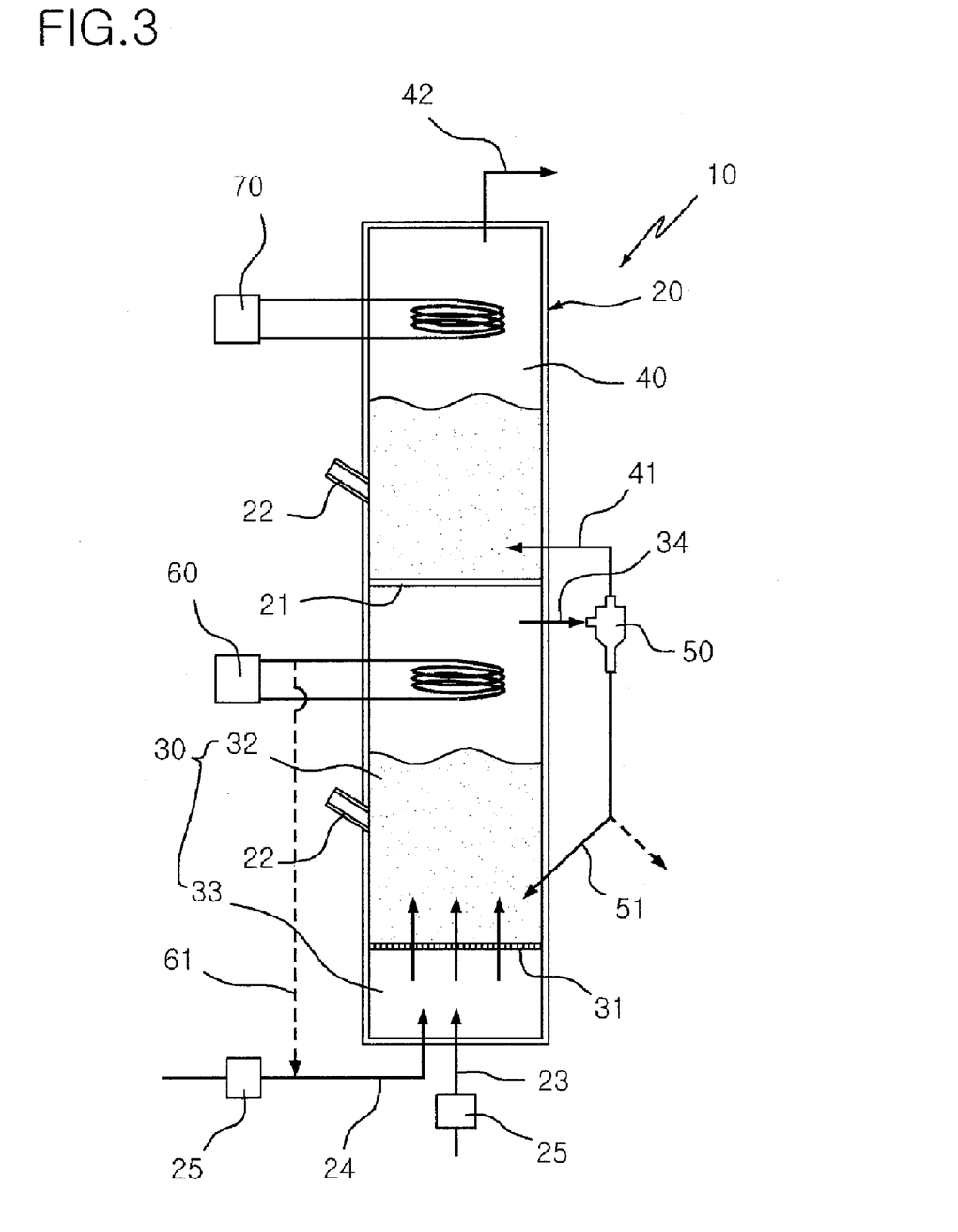

In this case, the first heat exchanger 60 uses water/steam as a heat exchange medium to remove (or recover) heat from the high temperature reaction gas, dissipates the heat of the phase-changed steam via an external condenser, and then, provides the treated steam to the high temperature catalytic reaction chamber 30, thus completing heat exchange. Otherwise, as illustrated in FIG. 3, the phase-changed steam after heat exchange may be fed into the bottom mixing space 33 of the high temperature catalytic reaction chamber via a steam feed line 24 and be used as a steam generation source.

Further, a second heat exchanger 70 is fixed to a top of the low temperature catalytic reaction chamber 40 to decrease an output temperature of the low temperature reaction gas obtained after hydrogen conversion at a low temperature is over.

Figure 4:
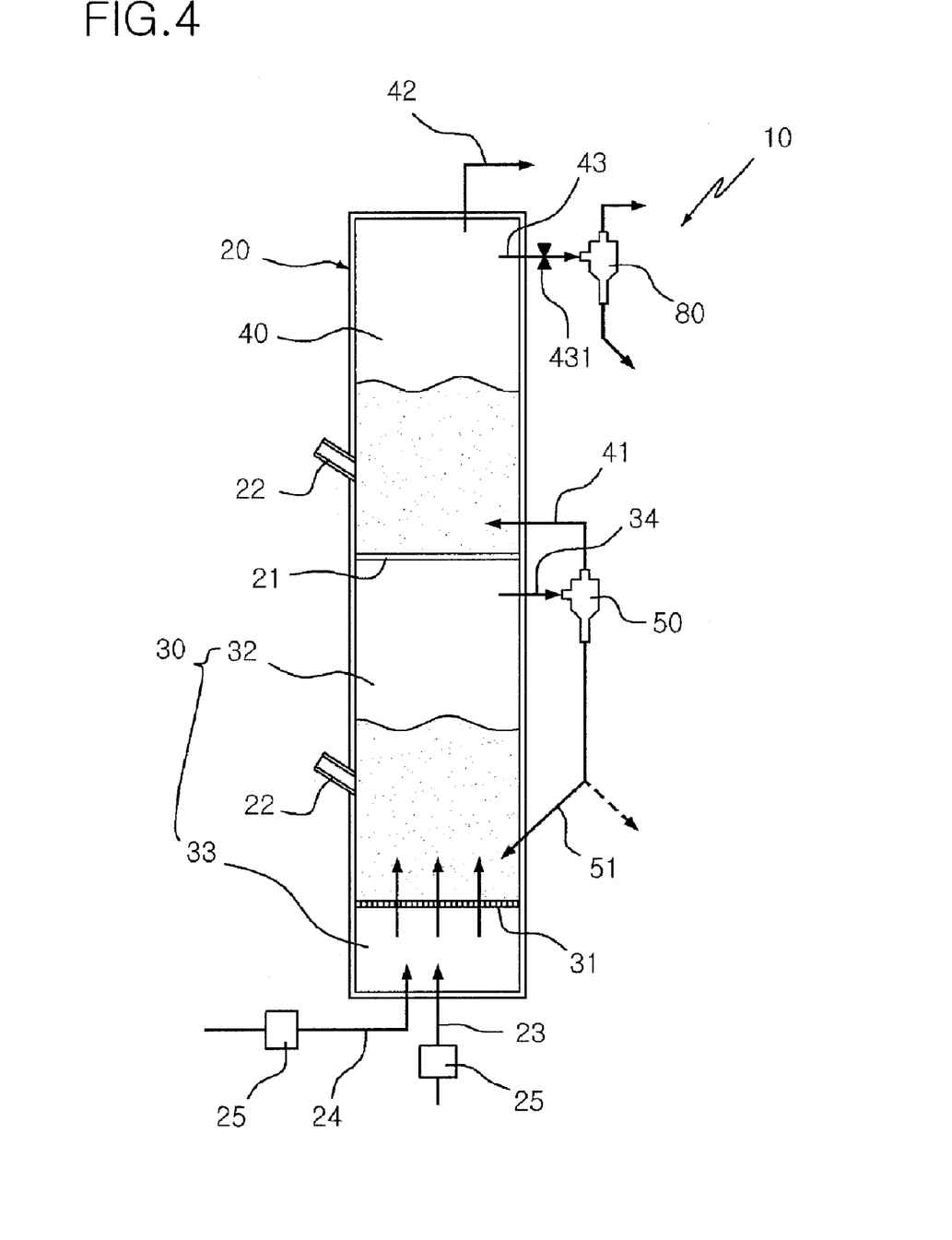

Like the high temperature catalyst, the low temperature catalyst contained in the low temperature catalytic reaction chamber 40 becomes worn or damaged by repetitive reactions of the fluidized bed. In order to supplement loss of the catalyst due to abrasion or damage, the catalyst inlet 22 is formed on a lateral side of the high temperature catalytic reaction chamber to continuously feed the low temperature catalyst thereto, like the high temperature catalytic reaction chamber, while the worn or damaged catalyst is removed by an auxiliary cyclone 80.

As illustrated in FIG. 4, the low temperature catalytic reaction chamber 40 is connected with the auxiliary cyclone 80 via an auxiliary output line 43 equipped with a sluice valve 431 at an upper lateral side of the chamber. Fine and light powders float upward during fluidization of the low temperature catalyst and the floating powders as well as the low temperature reaction gas enter into the auxiliary cyclone and are separated and removed in the same.

Figure 5:
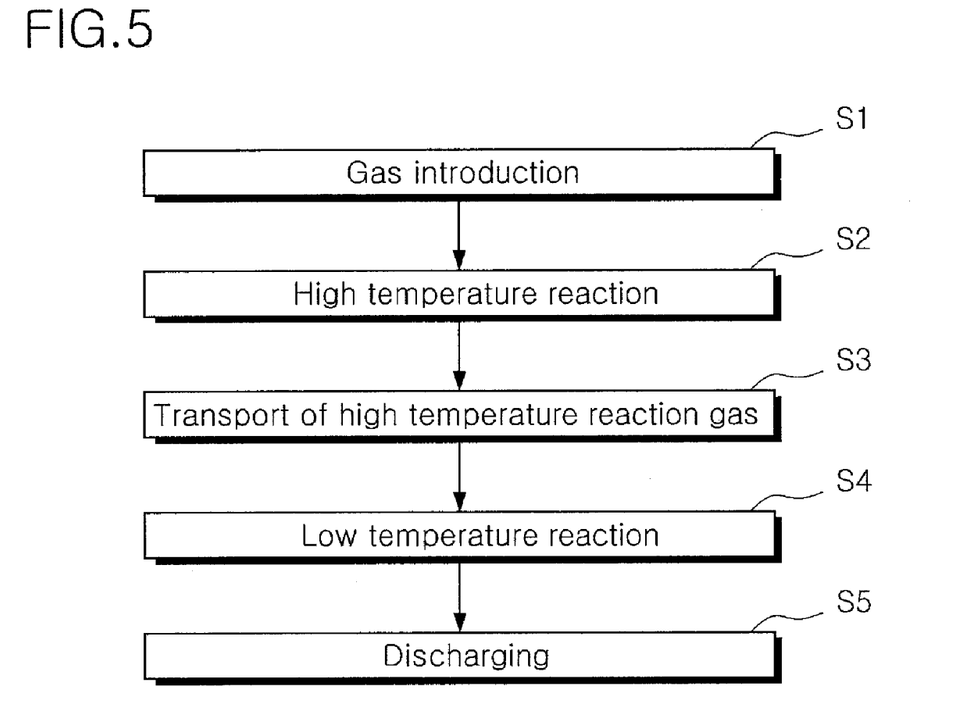
FIGS. 5 to 8 are flow diagrams illustrating a process of generating hydrogen by the multi-fluidized bed water-gas shift reactor using a syngas according to an exemplary embodiment of the present invention.

Referring to FIG. 5, according to another aspect of the present invention, a hydrogen production method using the multi-fluidized bed water-gas shift reactor with the syngas will be described below. Initially, a gas introduction process S1 of feeding steam and a gas mixture containing 30 to 70% carbon monoxide into the bottom mixing space of the high temperature catalytic reaction chamber in which a high temperature catalyst is loaded, is carried out. Here, the gas mixture and the steam introduced into the chamber are blended in the bottom mixing space and then dispersed into the top reaction space or, otherwise, are pre-mixed and then introduced into the top reaction space through the bottom mixing space. Such gas mixture and steam may be pre-heated by a preheater in order to maintain a desired temperature.

Then, a high temperature reaction process S2 follows. In this stage, the gas mixture and the steam flowing through the porous plate are injected over the high temperature catalyst loaded in the top reaction space of the high temperature catalytic reaction chamber and increase a contact area between the high temperature catalyst, the gas mixture and the steam, enabling hydrogen conversion by the high temperature catalyst at a high temperature of 300 to 450° C.

After the foregoing process is over, a high temperature reaction gas transport process S3 is performed. This process comprises passing the high temperature reaction gas obtained after the high temperature reaction, through the cyclone so as to remove impurities therefrom, and then, feeding only the high temperature reaction gas in a pure state into the low temperature catalytic reaction chamber.

Figure 6:
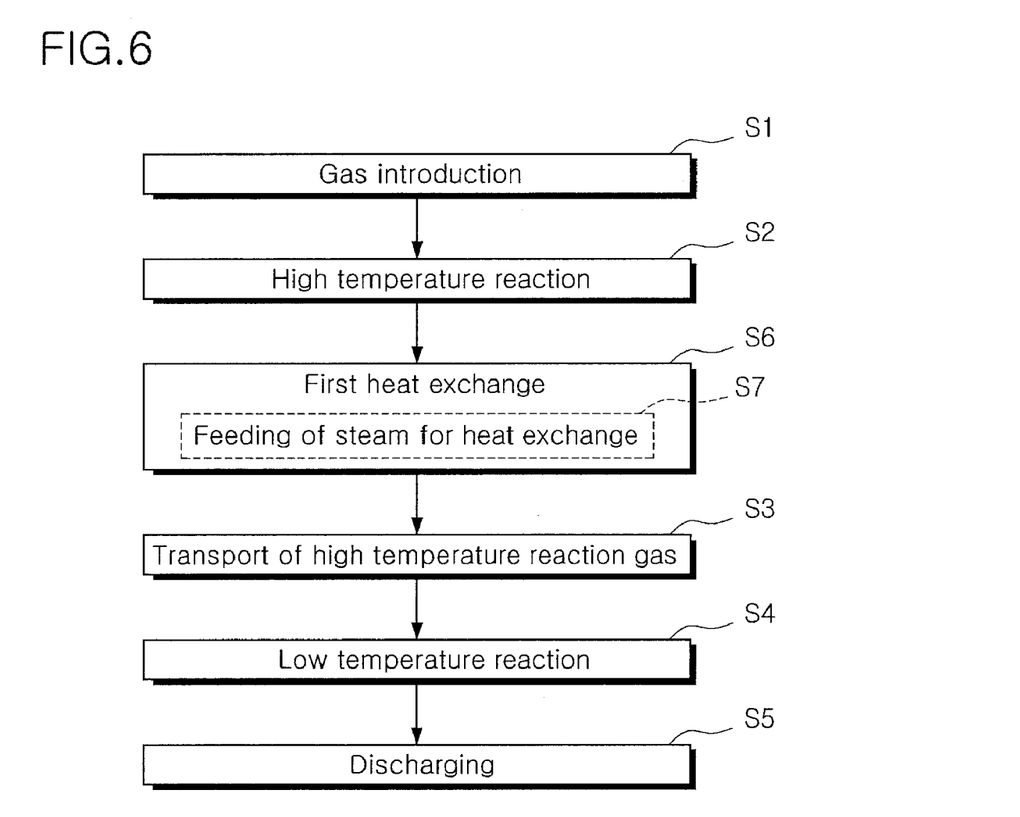

Although the above high temperature reaction gas is in a high temperature state, the reaction gas is subjected to a first heat exchange process S6 before being transported into the low temperature catalytic reaction chamber containing the low temperature catalyst, as illustrated in FIG. 6. During the first heat exchange stage, the first heat exchanger recovers heat from the reaction gas after the high temperature reaction and before outputting the same, which in turn enables transport of the reaction gas with relatively decreased temperature.

Here, the first heat exchange process may further include a step of supplying a heat exchange steam S7 wherein the phase-changed steam after heat exchange is introduced into the bottom mixing space of the high temperature catalytic reaction chamber, thus preventing heat loss and reducing energy consumption.

Following this, a low temperature reaction process S4 is executed by feeding the high temperature reaction gas into the low temperature catalytic reaction chamber in which the gas is in contact with the low temperature catalyst flowing at a low temperature of about 200 to 250° C., so as to enable a reforming reaction to convert a carbon monoxide residue into hydrogen.

Figure 7:
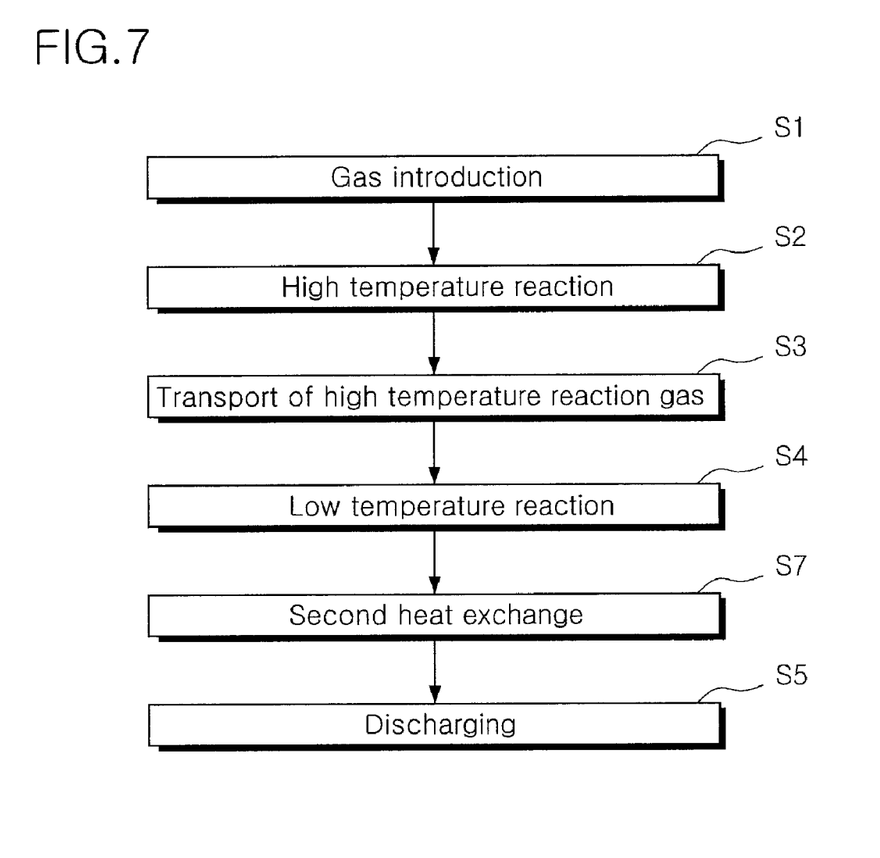

Since the low temperature reaction gas obtained after completing the low temperature reaction also has a high temperature, a second heat exchange process S8 is conducted in order to reduce the temperature before discharging the reaction gas S5, as illustrated in FIG. 7.

Figure 8:
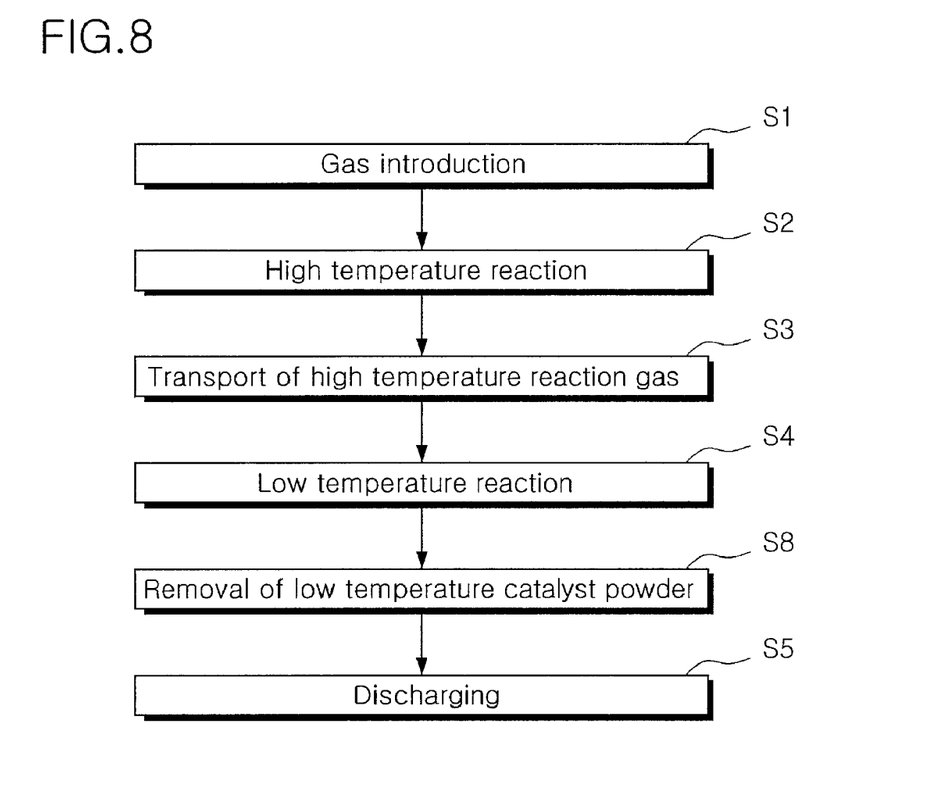

The low temperature catalyst contained in the low temperature catalytic reaction chamber is worn by fluidization. Therefore, as illustrated in FIG. 8, a process of discharging a low temperature catalyst powder S9 to remove the worn catalyst powder by the auxiliary cyclone is further carried out. Here, if a height of the fluidized bed containing the low temperature catalyst is below a desired level, this means that an amount of the worn catalyst is considerably large. Therefore, the low temperature reaction gas containing the catalyst powder is discharged outside by closing the low temperature reaction gas output line while opening the sluice valve, thereby removing the catalyst powder from the auxiliary cyclone.

The following example will describe an exemplary embodiment of the present invention in detail.

EXAMPLE 1

High and Low Temperature Water-Gas Shift Reactions Using a Catalytic Reaction System To conduct this experiment, a fluidized bed water-gas shift reactor having an inner diameter of 350 mm and a height of 1200 mm was employed.

The reactor was fabricated in a fluidized bed mode, which receives steam and a syngas at a bottom thereof.

A catalyst used herein is commercially available and was sufficiently activated under a hydrogen atmosphere before the experiment.

After the reaction was over, the unreacted steam was entrapped in a chilled collector. The syngas injected to the reactor has compositional ratios of $H_2:CO:CO_2=2:2:1$ and $H_2O/CO=2.5$. Results of such syngas injection are shown in TABLE 1 below.

TABLE 1

| Total flow rate (ml/min) | GAS (ml/min) | | | $H_2O$ (cc/min) |
|---|---|---|---|---|
| | $H_2$ | CO | $CO_2$ | |
| 400 | 80 | 80 | 40 | 0.146 |
| 800 | 160 | 160 | 80 | 0.293 |
| 1200 | 240 | 240 | 120 | 0.439 |
| 1600 | 320 | 320 | 160 | 0.585 |
| 1990 | 398 | 398 | 199 | 0.728 |
| 2490 | 498 | 498 | 249 | 0.911 |

Figure 9:
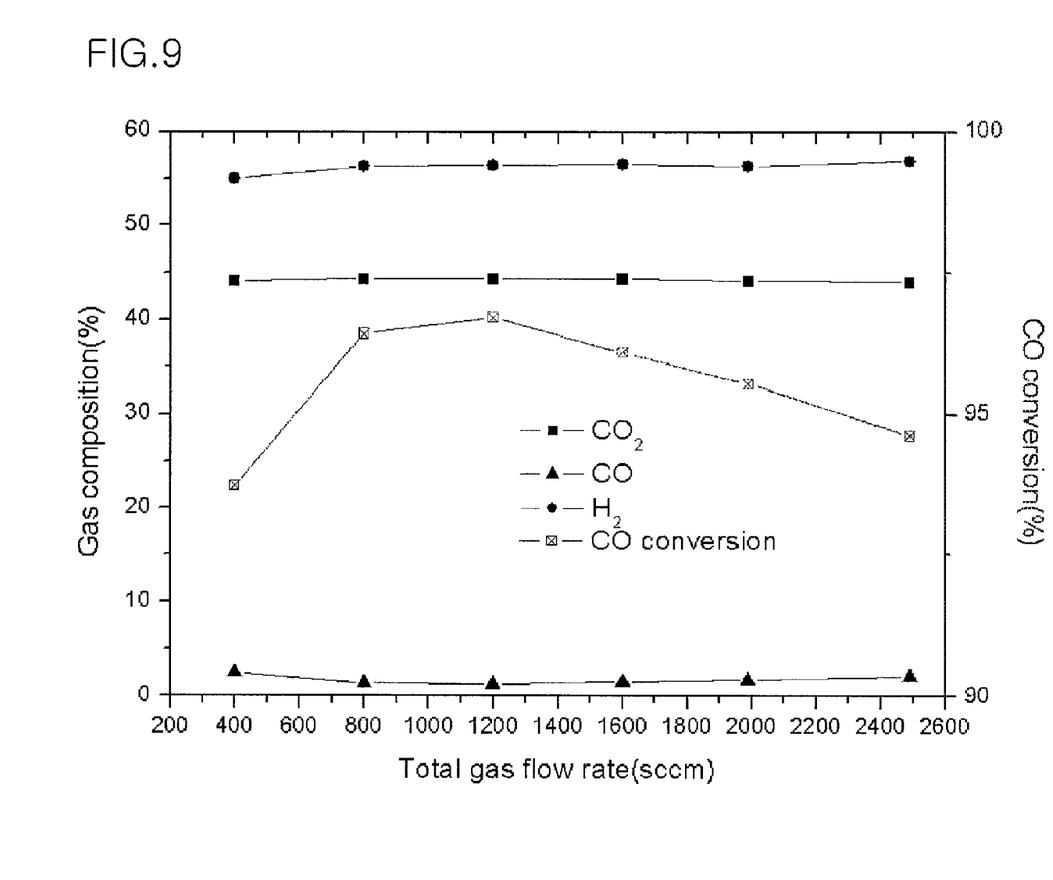
FIGS. 9 and 10 are graphs illustrating experimental data of a water-gas shift reaction at each of high and low temperatures, respectively, according to the present invention.
Figure 10:
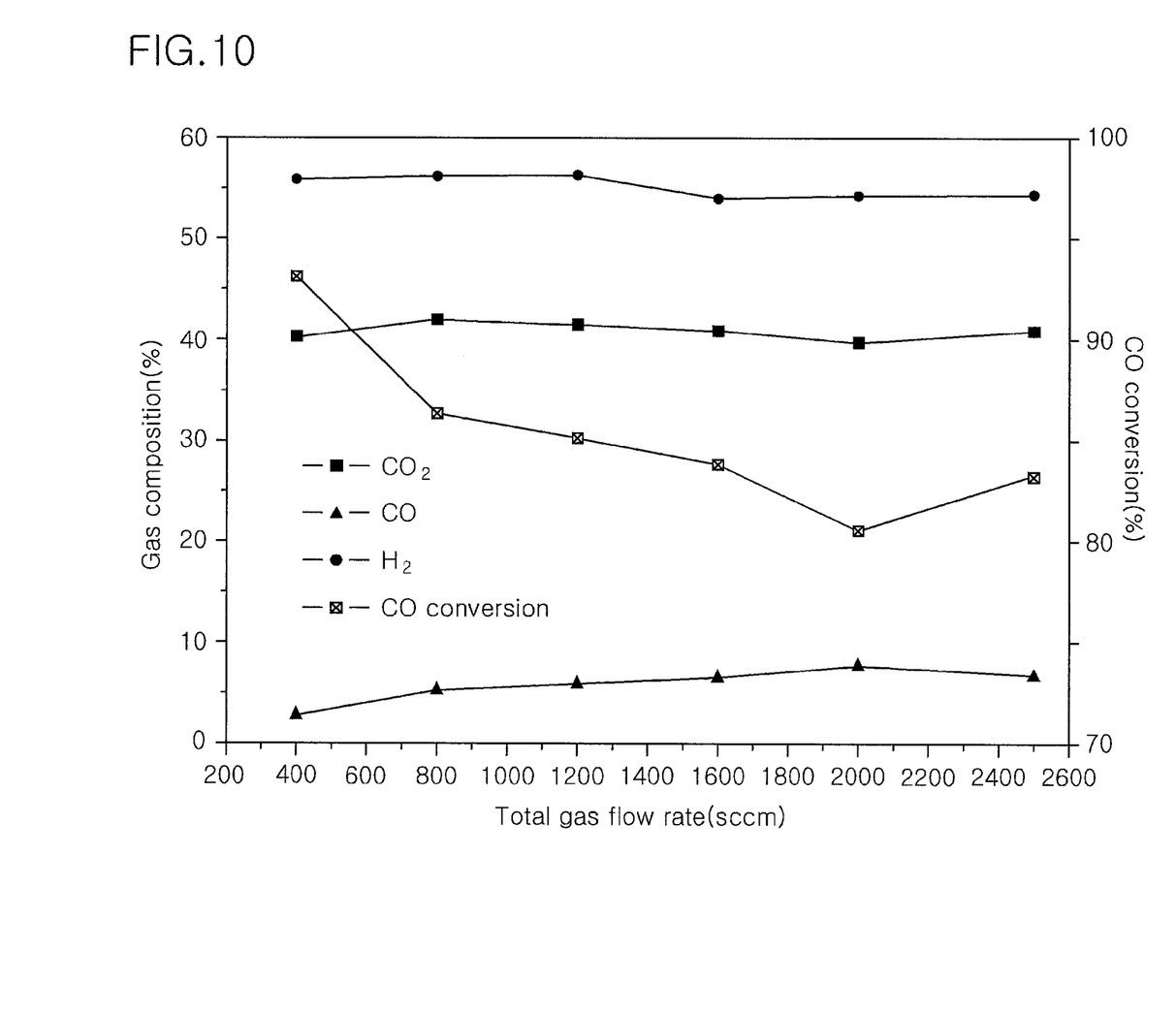

The high and low temperature water-gas shift reactions were investigated using the above reaction system and results thereof are illustrated in FIGS. 9 and 10.

The catalyst system used in the high temperature water-gas shift reaction contained 30 g of catalyst in particulate form having a size of 200 μm, and was operated in a fluidized bed mode with a continuous flow at a flow rate of 400 to 2490 sccm.

In order to sufficiently conduct a reaction of the gas initially fed in a reactor, each feed amount of the gas was maintained for about 1 hour and an outlet gas flow after the reaction was subjected to real time analysis by micro-gas chromatography to examine activity of the foregoing shift reaction.

FIG. 9 illustrates variation in CO conversion depending on increase in amount of the feed gas as a result of the high temperature water-gas shift reaction at a temperature of 573K, using a high temperature catalyst commercially available in the art.

In particular, where the flow rate is continuously sustained in the range of 800 to 1200 sccm, the most excellent CO conversion is observed. In the high temperature water-gas shift reaction, it was found that more than 90% of CO is converted into hydrogen. The converted product is moved into a low temperature water-gas shift reactor, which in turn, is discharged at a desired concentration.

FIG. 10 illustrates a result of the water-gas shift reaction experiment using a low temperature catalyst under a constant gas condition.

In this experiment, 30 g of catalyst in particulate form having a size of 200 μm was used and a syngas was fed into a reactor to flow in a fluidized bed mode at a flow rate of 400 to 2490 sccm. In order to sufficiently conduct the reaction, each feed amount of the syngas was maintained for about 1 hour.

As illustrated in the drawings, for the low temperature water-gas shift reaction, it was also found that CO conversion is varied depending on an increase in amount of the feed gas. Particularly, contrary to the high temperature water-gas shift reaction, the CO conversion was deteriorated with increase in amount of the feed gas.

From the foregoing results, it can be seen that a greater amount of gas is treated if a water-gas shift reaction is executed in a fluidized bed mode, compared to a fixed bed type reaction. However, conversion of the gas is gradually reduced with increased flow rate and this calls for favorable control of operational conditions.

As is apparent from the above example, it can be seen that a high and/or low temperature catalytic process is singly or continuously performed to control CO conditions in a final gas product.

Although the preferred embodiment of the present invention has been disclosed for illustrative purposes, those skilled in the art will appreciate that various modifications, additions and substitutions are possible, without departing from the scope and spirit of the invention as disclosed in the appended claims.

What is claimed is:

1. A multi-fluidized bed water-gas shift reactor including a gas reaction tank 20 which has upper and lower chambers separated by a compartment 21 placed in the middle of the tank, comprising:
  a high temperature catalytic reaction chamber 30 as the lower chamber partitioned in the tank by the compartment 21, including a top reaction space 32 in which a high temperature catalyst capable of converting carbon monoxide into hydrogen at a high temperature is loaded, as well as a bottom mixing space 33, wherein both the spaces 32 and 33 are partitioned by a porous plate 31, a syngas input line 23 and a steam input line 24 are connected to the bottom mixing space with a preheater 25 connected to the syngas input line 23;
  a low temperature catalytic reaction chamber 40 as the top reaction chamber partitioned in the tank by the compartment wherein a low temperature catalyst is loaded in the top chamber, and a high temperature catalytic reaction gas output line 43 connected to a top of the chamber; and
  a cyclone 50 connected to an output line 34 which is connected to the top of the reaction chamber 30, and the cyclone 50 is also connected to the catalytic reaction chamber 40 through a reaction gas input line 41, and in addition the cyclone 50 is connected to a catalyst recycling line 51.

2. The reactor according to claim 1, wherein the top reaction space 32 of the reaction chamber 30 and the catalytic reaction chamber 40 have a first heat exchanger 60 and a second heat exchanger 70, respectively.

3. The reactor according to claim 1, wherein the reaction gas output line 43 equipped with a sluice valve 431 is connected to a top of the low temperature catalytic reaction chamber 40 and an auxiliary cyclone 80 is fixed at one side end of the auxiliary output line 43.

4. The reactor according to claim 2, wherein the first heat exchanger 60 is connected to the bottom mixing space 33 of the catalytic reaction chamber 40 via a circulation line 61.

5. A method for production of hydrogen comprising utilizing the multi-fluidized bed water-gas shift reactor as claimed in claim 1, wherein the method comprises:
- a gas introduction process (S1) of feeding a gas mixture and steam into the bottom mixing space of the high temperature catalytic reaction chamber in which a high temperature catalyst is loaded;
- a high temperature reaction process (S2) of dispersing the gas mixture and the steam throughout the top reaction space of the high temperature catalytic reaction chamber through a porous plate which in turn enables hydrogen conversion by the high temperature catalyst at a high temperature of 300 to 450° C.;
- a high temperature reaction gas transport process (S3) of separating the high temperature reaction gas from impurities by the cyclone and feeding only a pure high temperature reaction gas into the low temperature catalytic reaction chamber;
- a low temperature reaction process (S4) of converting the transported gas into hydrogen in the cyclone using a low temperature catalyst at a low temperature of 200 to 250° C.; and
- a process of discharging the low temperature reaction gas with increased hydrogen content (S5).

6. The method according to claim 5, further comprising a first heat exchanging process S6 of recovering heat from the high temperature reaction gas using a heat exchanger and transporting the same to the low temperature chamber, after the high temperature reaction process S2.

7. The method according to claim 6, further comprising a heat exchanging steam introduction process S7 of feeding the used steam as a heat exchange gas in the first heat exchanging process S6 into the bottom mixing space of the high temperature catalytic reaction chamber.

8. The method according to claim 5, wherein the low temperature reaction process S4 further includes a second heat exchanging process S8 of recovering heat from the low temperature reaction gas using a heat exchanger and exhausting the same, after completing the reaction.

9. The method according to claim 5, wherein the low temperature reaction process S4 further includes a low temperature catalyst powder removal process S9 of eliminating catalyst powders generated due to a reaction repeatedly conducted at a low temperature by solid-gas separation in the an auxiliary cyclone communicating with an auxiliary output line equipped with a sluice valve.

* * * * *